UNITED STATES PATENT OFFICE 2,225,146

PORTLAND CEMENT AND ITS MANUFACTURE

Ira C. Bechtold, Colton, Calif., assignor to California Portland Cement Company, Los Angeles, Calif., a corporation of California No Drawing. Application November 10, 1937, Serial No. 173,841

7 Claims. (Cl. 106—27)

This invention has to do generally with an improved Portland cement and its method of manufacture, and relates particularly to the use in Portland cement manufacture of an added material that has the combined advantages of facilitating and economizing grinding operations, and imparting to the finished cement a number of definitely improved properties. In accordance with the invention, Portland cement clinker may advantageously be ground to relatively high fineness with substantially less power consumption in the grinding mills, and a resultant product obtained which, because of its greater fineness and the added material, develops higher strengths upon hardening, possesses superior plastic properties, and indicates less expansion in the autoclave test for soundness.

When Portland cement clinker is ground to produce the finished cement, the energy required to reduce the clinker material to relatively high fineness becomes excessively great. Below certain limits of fineness, grinding can be accomplished with little difficulty. However, above these limits it becomes increasingly more difficult to reduce the particles of clinker to smaller size because of the tendency of Portland cement clinker to build a coating of the finer material on the grinding media and the walls of the mill. The cushioning action resulting from this coating acts to reduce free operation of the grinding media and much of the energy being expended in the mill is converted to heat. This results in serious heating of the mill and loss of grinding efficiency.

It has been known that certain substances added to the Portland cement clinker will cause the particles of ground clinker to be dispersed and the coating of the mill and grinding media to be reduced or substantially eliminated. In many instances the substances used for this purpose have the disadvantage that they cause undesirable properties to be produced in the resulting cement. Color may be altered seriously, setting time may be adversely affected, strength development may be impaired, volume change may be excessively increased, etc.

In accordance with the present process I am able to produce a fine cement at reduced cost and still retain all of the desirable properties of the original clinker. In certain instances these properties are improved. I have found that, when small quantities of dihydric alcohols (by which I mean the glycols) are added to the Portland cement clinker before grinding, there is a marked improvement in grindability of the clinker. That is to say, a greater fineness is produced with a given amount of energy expended when the glycol is present. The common dihydric alcohols including ethylene glycol

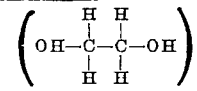

propylene glycol

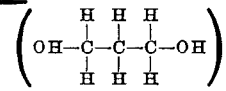

diethylene glycol

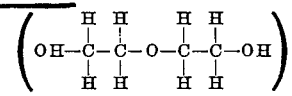

and triethylene glycol

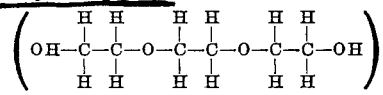

have been investigated, and each has been found to produce the same general effect upon the grindability of the clinker. Although for certain cements there may be some preference in the particular glycol, or combination of glycols, selected for the purpose of this invention, it will be understood that any of the dihydric alcohols may be used singly or in any combinations productive of best results.

In order to demonstrate the advantages to be gained from the present process, cements containing the above mentioned glycols were prepared and a series of tests made to evaluate the properties of these cements. A supply of Portland cement clinker from the clinker stock of a commercial unit was crushed and pulverized until 100% passed an 8 mesh sieve. This supply of clinker was used in all grinding experiments in order that all grinding would be performed on material of the same composition and initial particle size distribution. Individual samples of this crushed clinker stock, each consisting of 1816 grams thereof and 69 grams of gypsum, were prepared and small amounts of the various glycols added to the samples, except one, in percentages indicated in Table I below. The individual samples then were subjected to two stage grinding in a steel "jar mill" 11½ inches in diameter and 10 inches long. The preliminary grinding consisted of 900 revolutions in the mill with a ball charge of 45 lbs. of steel balls 1¼ inches in diameter. The final grinding consisted of 1665 revolutions in the mill with a ball charge of 70 lbs. of steel balls ⅜ to ½ inch in diameter.

After being produced in the above manner the cements were subjected to various physical tests to determine their properties. Fineness was determined by the Wagner turbidimeter using the method described in Proceedings of the American Society of Testing Materials, vol. 33, part II, page 553, 1933. An alternate determination was made by means of an air analyzer of the Pearson type to determine the proportion of particles smaller than 20 microns in diameter present in the ground cement. Water required for "normal consistency" was determined by the well known method. Setting time was determined by means of the Gilmore needle on standard pats. Strength tests were made by the A. S. T. M. method for tensile strength using a 1:3 Ottawa sand mortar. Data on soundness were secured by autoclaving 1 by 1 by 5 inch (gauge length) bars of neat cement paste at 420° F. and 300 lb. steam pressure for a period of 5 hours. This included a one hour period for raising the temperature of the autoclave and one hour for cooling. These bars were measured by means of a micrometer comparator before and after autoclaving. Table I shows the data resulting from these tests.

fact that they are ground finer and would be expected to have a shorter setting time if the admixture did not have a specific beneficial effect.

Cements produced by the present process exhibit marked increases in strength development at early ages, such as one day, as compared with the plain cement used as a control (Sample A). This is especially remarkable in view of the increase in water requirement for normal consistency attending the addition of the admixture.

Samples B to I show less expansion in the autoclave test for soundness than the corresponding plain cement.

The increased fineness of the experimental cements is no doubt responsible for some of the beneficial results obtained through the use of the present process. However, it is also indicated that the dihydric alcohols have a specific effect, apart from their function as grinding aids, to ideally control setting time and to aid in the production of a more ideal hardening history.

In the past this subject has not been well-developed in the art as far as the fundamental aspects of the action of grinding aids is concerned. The basic principles of chemistry and physics which explain the mechanisms underlying the packing or caking of finely ground cements in the milling operation have not been thoroughly investigated nor adequately explained. Furthermore, an adequate explanation of the fundamental phenomena which are involved in the action of grinding aids has not been known. This is especially true of any knowledge which will apply to a wide variety of organic substances of extreme diversity of chemical and physical properties.

*Table I*

| Sample | Admixture | Admixture proportion | Fineness | | Percent water for N. C. | Setting time | | | | Tensile strength | | Autoclave soundness |
| | | | Specific surface | 0/0-20 microns | | Initial | | Final | | 1 day | 7 days | |
| | | | | | | Hours | Minutes | Hours | Minutes | | | |
|---|---|---|---|---|---|---|---|---|---|---|---|---|
| | | *Percent* | | | | | | | | | | |
| A | None | 0.00 | 1,941 | 54.76 | 24.0 | 2 | 10 | 4 | 20 | 142 | 343 | +0.568 |
| B | Ethylene glycol | 0.10 | 2,089 | 64.48 | 27.2 | 2 | 20 | 5 | 27 | 186 | 416 | +0.384 |
| C | do | 0.25 | 2,113 | 61.87 | 27.2 | 2 | 59 | 5 | 54 | 221 | 409 | +0.338 |
| D | Propylene glycol | 0.10 | 2,134 | 66.40 | 30.0 | 2 | 15 | 5 | 22 | 137 | 418 | +0.470 |
| E | do | 0.25 | 2,261 | 67.43 | 28.5 | 2 | 19 | 5 | 00 | 213 | 383 | +0.338 |
| F | Diethylene glycol | 0.10 | 2,193 | 66.12 | 28.6 | 2 | 12 | 4 | 37 | 212 | 432 | +0.400 |
| G | do | 0.25 | 2,276 | 64.78 | 27.0 | 2 | 21 | 4 | 30 | 269 | 377 | +0.314 |
| H | Triethylene glycol | 0.10 | 2,208 | 63.66 | 28.0 | 2 | 00 | 4 | 25 | 173 | 411 | +0.486 |
| I | do | 0.25 | 2,210 | 59.40 | 27.0 | 1 | 55 | 4 | 20 | 202 | 359 | +0.484 |

A study of Table I reveals the following advantages which result from the improved method of grinding Portland cement clinker:

Dihydric alcohols serve as grinding aids to produce a greater degree of fineness with the same amount of grinding energy expended on the control cement (Sample A). Thus cements may be ground to a higher level of fineness before difficulties are encountered in the way of mill coating, heating and loss of grinding efficiency. On the other hand, if it is desirable to grind at a low level of fineness, a reduced amount of energy will be expended if the dihydric alcohols are present. Fineness data indicate there is a marked increase in the production of particles in the range of 20 microns and under when the present process is used.

The presence of the dihydric alcohols does not affect the setting time of the finished cement in an adverse manner. In fact the cements containing these substances retain the same setting time or show an increase in setting time despite the While this invention is not to be considered as restricted to any particular theory, there are certain hypothetical explanations which are useful in considering its effects and results. It is thought that cement particles may be regarded as heterogeneous masses composed of several crystalline compounds embedded in a matrix of glass-like, under-cooled melt. As these are reduced in size they may become less heterogeneous by virtue of approaching the size corresponding to that of the grains of the individual constituents. It may even be possible that in some cases the smallest particles consist of a single constituent. At this point the situation may be such as that believed to exist when a crystalline mass is reduced in size to the point where the crystal lattice is no longer complete. That is to say, the surface of the individual particle consists of partial unit cells, and the particle as a whole does not have its atoms proportioned in an exact stoichiometrical ratio. Therefore, polar groups would be present in electrically unbalanced numbers on an individual particle. Two such particles with groups having their balance shifted to opposite electrical sign would be expected to be attracted and hence aggregations might develop and the particles would be packed or caked.

The action of a grinding aid is then explainable in the following manner. A substance which functions as a grinding aid is probably one which surrounds the particles of cement with a film or layer. This layer shields the surface groups of the particle and produces an external surface which is uniform over the entire particle and is also identical on all particles. Therefore, a cement treated with a grinding aid is composed of particles of like surface characteristics and they tend to repel each other or remain dispersed.

Glycols are known to have anomalous surface energies at the surfaces of their liquids. Gallaugher and Hibbert (Journal of the American Chemical Society, vol. 59, Number 12, December 1937, pages 2514 et seq.) have studied this effect and explain it in view of the assumption that the glycol molecule orients itself at the air-liquid interface in the form of an inverted U with the polar —OH groups in the liquid and the ethylene oxide group or groups toward the air. It is suggested that it is this latter group which controls the total surface energy.

It is now postulated by the applicant that the polar —OH groups will orient themselves on a cement particle by being attracted to the polar surface of the particle in the same position as they would have at the air-liquid interface of their own liquids. The remainder of the molecule, therefore, points toward the air phase and the ethylene oxide group is at the apex of the inverted U where it controls total surface energy. The particles are therefore coated with a uniform film of glycol molecules as soon as there are sufficient molecules so that the sum of their effective molecular areas is equivalent to the area of the particle surface. Thus, it is believed that it is the first layer, or the "monomolecular layer," which is most effective in producing the grinding aid action, and that the addition of other layers may not be of great significance. In fact with some substances the addition of too many layers may vitiate the effect by having the surface assume the physical characteristics of the filming substance in microscopic form. Thus it is seen that the numerous cement particles have their peculiarly characteristic polar surface groups shielded with like films and when they approach each other they present these like, non-polar surfaces toward each other and therefore there is a tendency toward repulsion rather than attraction.

The organic admixtures utilized in the present process do not increase the expansion of cements containing them when tested in the autoclave test for soundness. This is in contrast to the effect produced by certain previously known admixtures or substances used for grinding aids. For example, I have found that when oleic acid is used as a grinding aid the autoclave expansion is increased from +0.732% on a control sample to +6.082% on a sample containing 0.25% of oleic acid. I have found that fatty acids in general exhibit the same effect upon autoclave expansion. Other commonly used organic acids are rosin and stearic acid. Table II shows the effect of the presence of these substances upon autoclave expansion.

*Table II*

| Notation | Admixture | Admixture proportion | Autoclave soundness |
| --- | --- | --- | --- |
| | | Percent | Percent |
| A | Control—None | | +0.732 |
| B | Oleic acid | 0.125 | +1.748 |
| C | ....do.... | 0.250 | +6.082 |
| D | Stearic acid | 0.377 | +5.492 |
| E | Rosin | 0.500 | +1.312 |

Substantially colorless glycols may be used in the present process, and hence no undesirable color is imparted to the cement. They do not cause the cement containing them to become water repellent as do the fatty acid substances. It will be understood that the selected glycol may be added to the clinker in any suitable proportion, although its percentage will of course be small and ordinarily in the neighborhood of the percentages given in Table I, or within the range of from substantially 0.05% to 0.30%, by weight, of the clinker and added gypsum.

It may be mentioned that in referring to the dihydric alcohols, I also include in this classification the related mixed compounds characterized also by the presence of two OH groups and possessing, as cement grinding aids and Portland cement admixtures, the same general properties as those described above with reference to the specifically named compounds.

I claim:

1. Portland cement in dry finely divided form containing a small percentage of a glycol uniformly distributed throughout the cement and coating the individual particles thereof.

2. Portland cement in dry finely divided form containing substantially 0.05% to 0.30% by weight of a glycol uniformly distributed throughout the cement and coating the individual particles thereof.

3. Portland cement in dry finely divided form having a specific surface in excess of 1900 and containing a small percentage of a glycol of the group ethylene, propylene, diethylene and triethylene glycol uniformly distributed throughout the cement and coating the individual particles thereof.

4. Portland cement in dry finely divided form having a specific surface in excess of 1900, produced by grinding Portland cement clinker containing substantially 0.05% to 0.30% by weight of a glycol uniformly distributed throughout the cement and coating the individual particles thereof.

5. The process that includes, finely grinding Portland cement clinker admixed with a small percentage of a glycol to produce Portland cement in finely divided form.

6. The process that includes, finely grinding Portland cement clinker admixed with substantially 0.05% to 0.30% by weight of a glycol to produce Portland cement in finely divided form.

7. The process that includes, finely grinding Portland cement clinker admixed with a small percentage of a glycol of the group ethylene, propylene, diethylene and triethylene glycol, to produce Portland cement having a specific surface in excess of 1900.

IRA C. BECHTOLD.